(12) United States Patent
Podbielski et al.

(10) Patent No.: US 6,802,130 B2
(45) Date of Patent: Oct. 12, 2004

(54) ALIGNMENT DEVICE FOR ROTATING TIRE LASER MAPPING MACHINE

(75) Inventors: Sharon E. Podbielski, Akron, OH (US); John D. Clothiaux, Aiken, SC (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 9 days.

(21) Appl. No.: 10/260,592

(22) Filed: Sep. 30, 2002

(65) Prior Publication Data

US 2004/0060181 A1 Apr. 1, 2004

(51) Int. Cl.[7] .............................................. G01B 5/255
(52) U.S. Cl. ............................ 33/288; 73/1.75; 73/146
(58) Field of Search ........................ 33/288, 533, 613, 33/645, 502, 203, 203.11, 203.18; 73/1.01, 1.75, 146, 66, 459, 460, 461, 462

(56) References Cited

U.S. PATENT DOCUMENTS

| | | | |
|---|---|---|---|
| 3,918,816 A | | 11/1975 | Foster et al. ................. 356/167 |
| 5,054,918 A | | 10/1991 | Downing et al. ........... 356/152 |
| 5,109,609 A | * | 5/1992 | Anderson ..................... 33/502 |
| 5,134,781 A | * | 8/1992 | Baker ........................... 33/502 |
| 5,245,867 A | | 9/1993 | Sube et al. .................... 73/146 |
| 5,249,460 A | | 10/1993 | Dory et al. .................... 73/146 |
| 5,309,646 A | * | 5/1994 | Randolph et al. ............. 33/502 |
| 5,329,703 A | * | 7/1994 | Craig ............................ 33/567 |
| 5,481,812 A | * | 1/1996 | Pedano ......................... 33/613 |
| 5,598,358 A | | 1/1997 | Gender et al. ......... 364/571.01 |
| 5,724,128 A | | 3/1998 | January ................. 356/139.09 |
| 5,789,668 A | * | 8/1998 | Coe et al. ...................... 73/146 |
| 5,799,408 A | * | 9/1998 | Sprayberry ................... 33/645 |
| 5,842,281 A | * | 12/1998 | Mieling ................... 33/203.18 |
| 6,077,000 A | * | 6/2000 | Gibbons et al. .......... 408/72 B |
| 6,134,792 A | | 10/2000 | January ................... 33/203.18 |
| 6,151,793 A | * | 11/2000 | Carlen .......................... 33/645 |
| 2003/0056579 A1 | * | 3/2003 | Poulbot et al. ............... 73/146 |

* cited by examiner

Primary Examiner—Christopher W. Fulton
Assistant Examiner—Amy R. Cohen
(74) Attorney, Agent, or Firm—Cynthia S. Murphy; Michael R. Huber

(57) ABSTRACT

An alignment device (30) for mounting on a laser mapping machine in place of a tire. The alignment device (30) comprises alignment surfaces S1–S5 which, when mapped by the machine, will provide alignment parameters. Specifically, the mapping of the alignment surface S1 and the mapping of the alignment surface S2 reflect the perpendicularity of the machine's laser relative to the machine's rail in a first direction and a second direction perpendicular to the first direction. The mapping of the alignment surface S2 and the alignment surface S3 will reflect the parallelism of the rail to the machine's shaft in the first and second directions. The mapping of the alignment surface S4 and the alignment surface S5 will reflect radial and out-of-plane wobble.

20 Claims, 2 Drawing Sheets

ALIGNMENT DEVICE FOR ROTATING TIRE LASER MAPPING MACHINE

FIELD OF THE INVENTION

The present invention relates to a rotating tire laser mapping machine and, more particularly, to an alignment device for such a machine.

BACKGROUND OF THE INVENTION

A laser mapping machine is used to measure the tread wear in a tire as it progresses, for example, through a standardized wear test. The machine can comprise a hub upon which the tire is mounted, a motor-driven shaft connected to the hub, a laser probe positioned to measure tread wear (i.e., the distance from the probe to the tire surface), a rail for moving the laser probe across the tread of the tire, and a microprocessor for translating the laser probe readings into tread depth data.

A standardized wear test typically comprises the steps of initially laser mapping the tire tread, running the tire through a series of wear exercises, laser mapping the tire tread after each set of wear exercises, and then comparing laser mapping data to determine the wear characteristics of the tire. Accordingly, in order for the comparisons to accurately reflect wear, intra-component alignments in the laser mapping machine must not change between laser mappings. In the past, this has been accomplished by measuring the horizontal distance between the rail and the shaft and by determining the perpendicularity of the hub to the shaft. Specifically, a calibration T-bar has been provided with a measuring surface to measure the rail-shaft distance and to measure the rail-hub distance at different shaft rotation points. (If this rail-hub distance is constant at different shaft rotations, the perpendicularity of the shaft to the hub is confirmed.) The T-bar further includes a calibrated gage block of a known height so that a measurement can be taken to verify laser calibration.

SUMMARY OF THE INVENTION

The inventors appreciated that the horizontal probe-shaft distance and the shaft-rim orientation provided by the prior art calibration T-bar are not sufficient to quantify all of the alignments critical to ensure consistent laser mapping. More particularly, the inventors appreciated that six alignment parameters need to be quantified to guarantee test integrity, specifically (1) the perpendicularity of the laser to the laser rail in the horizontal plane, (2) the perpendicularity of the laser to the laser rail in the vertical plane, (3) the parallelism of the laser rail to the shaft in the horizontal plane, (4) the parallelism of the laser rail to the shaft in the vertical plane, and (5) the perpendicularity of the hub to the shaft; and (6) the degree of radial run-out in the shaft.

The present invention provides an alignment device that can determine these six alignment parameters. The alignment device is designed to be mounted directly to the laser mapping machine (in place of the tire) and includes a plurality of surfaces from which laser measurements can be taken for alignment purposes. In other words, a laser mapping is taken of the alignment device and the measurement data derived from the alignment surfaces is used to determine alignment issues.

More particularly, the present invention provides an alignment device shaped and sized to be mounted on the hub of a laser mapping machine in place of the tire, and comprising alignment surfaces S1–S5. The mapping of the alignment surface S1 and the mapping of the alignment surface S2 reflect the perpendicularity of the laser relative to the rail in a first direction and a second direction perpendicular to the first direction. The mapping of the alignment surface S2 and the alignment surface S3 will reflect the parallelism of the rail to the shaft in the first and second directions. The mapping of the alignment surface S4 and the alignment surface S5 will reflect radial and out-of-plane wobble.

The present invention provides these and other features hereinafter fully described and particularly pointed out in the claims. The following description and drawings set forth in detail certain illustrative embodiments of the invention. This embodiment is indicative, however, of but one of the various ways in which the principles of the invention can be employed.

DRAWINGS

DETAILED DESCRIPTION

Figure 1:
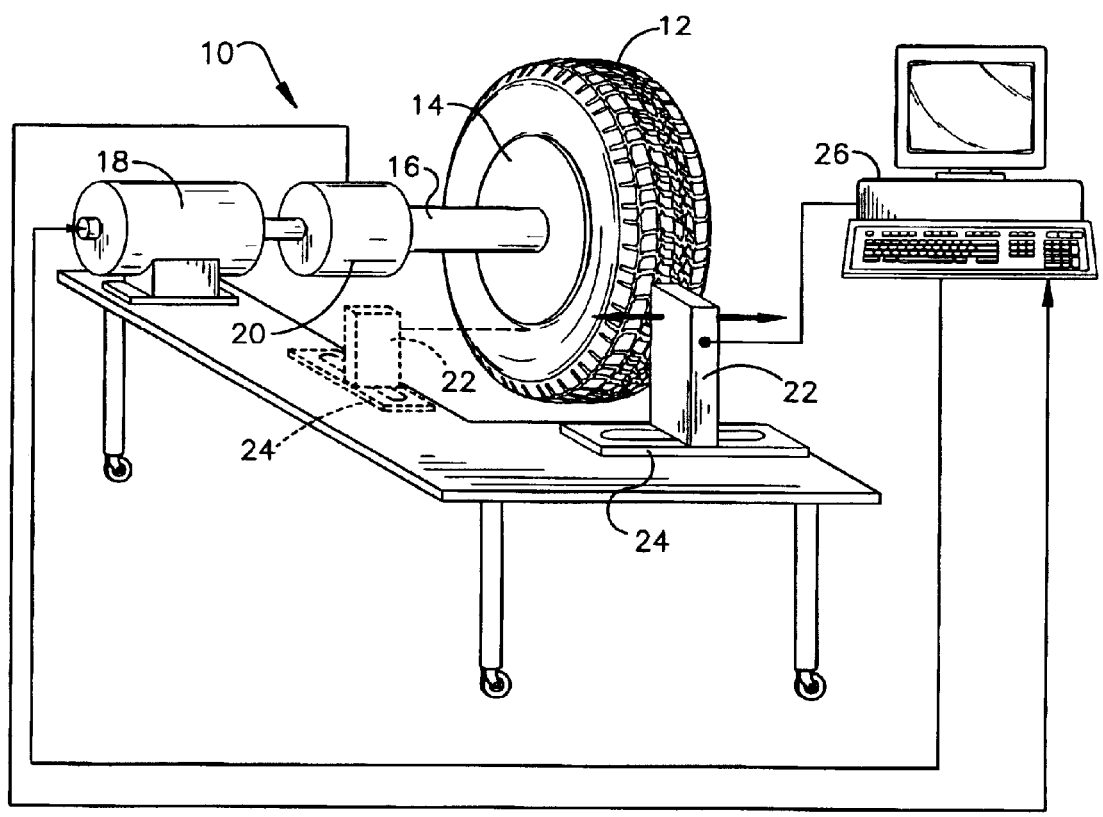
FIG. 1 is schematic diagram of a tire laser mapping machine.

Referring now to the drawings, and initially to FIG. 1, a tire laser mapping machine 10 is shown which can be used to measure the tread wear in a tire 12 as it progresses, for example, through a standardized wear test. The machine 10 comprises a hub 14 upon which the tire 12 is mounted, a motor-driven shaft 16 connected to the hub 14, a laser probe 22 positioned to measure tread wear (i.e., the distance from the probe to the tire surface), a rail 24 for moving the laser probe 22 across the tread of the tire 12, and a microprocessor 26 for translating the laser probe readings into tread depth data. Further details of such a tire laser mapping machine are set forth in U.S. Pat. No. 5,245,867 and the entire disclosure of this patent is hereby incorporated by reference.

It may be noted that although the illustrated machine 10 accommodates a vertically mounted tire 12, the present invention can be practiced on machines accommodating other orientations. For example, the present invention could be used with a machine accommodating a horizontally mounted tire, such as the machine disclosed in U.S. Pat. No. 5,249,460. The entire disclosure of this patent is also hereby incorporated by reference.

Figure 2:
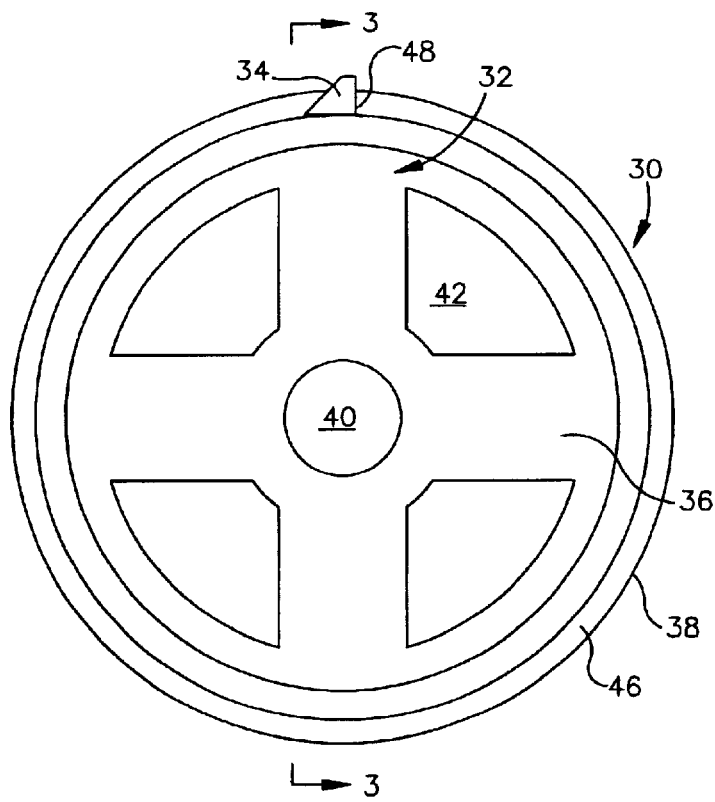
FIG. 2 is a front view of an alignment device according to the present invention.
Figure 3:
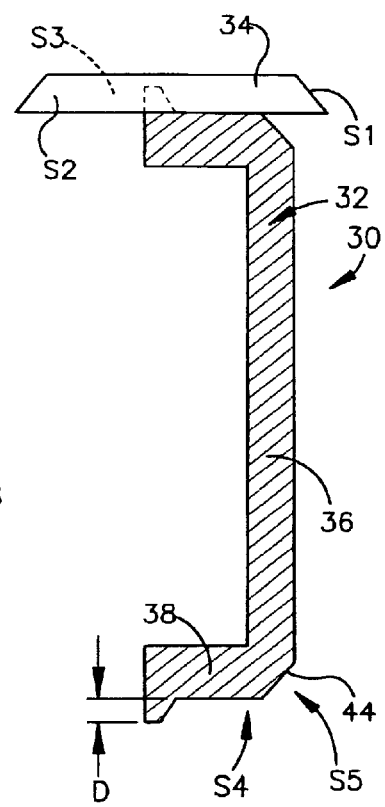
FIG. 3 is a side view of the alignment device.

Referring now to FIGS. 2 and 3, an alignment device 30 according to the present invention is shown. The alignment device 30 is designed to be mounted directly to the laser mapping machine 10 (in place of the tire) and includes a plurality of surfaces from which laser measurements can be taken for alignment purposes. When a laser mapping is taken of the alignment device 30, the measurement data derived from the alignment surfaces can be used to determine alignment issues.

The illustrated alignment device 30 comprises a round member 32 and a bar member 34. The round member 32 has a substantially circular base wall 36 and a cylindrical side wall 38 extending perpendicularly from the radial edge of the base wall 36. The circular base wall 36 includes a central opening 40 for engagement with the shaft 16 of the laser mapping machine. Other openings, such as illustrated openings 42, can be formed in the base wall 36 for ease and/or economics, but these openings do not play any part in the alignment process. The base wall 36 and the side wall 38 are connected by a cut-off corner 44, and the distal edge of the side wall 38 includes a radially outward lip 46. A notch 48 in the lip is provided for engagement with the bar member 34.

Figure 4:
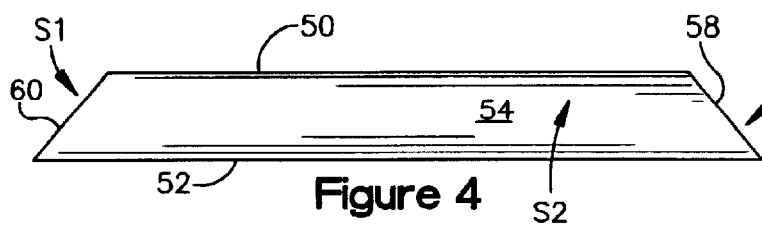
FIG. 4 is a side view of a component of the alignment device, namely a bar member.
Figure 6:
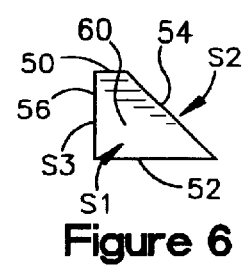
FIG. 6 is an end view of the bar member.
Figure 5:
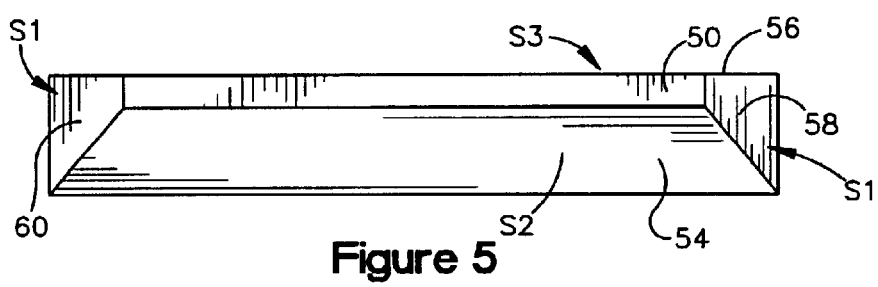
FIG. 5 is a top view of the bar member.

Referring now additionally to FIGS. 4–6, the illustrated bar member 34 has a top side 50, a bottom side 52, a front side 54, a back side 56, and end sides 58 and 60. The top side 50 and the bottom side 52 each have a rectangular shape with the bottom side 52 having a lesser width and a lesser length than the top side 50. The front side 54 and the back side 56 each have a trapezoidal shape with the non-parallel sides being equal in length. The front side 54 slants from the top side 50 to the bottom side 52. The back side 56 extends perpendicularly between the top side 50 and the bottom side 52. The end sides 58 and 60 each have a trapezoidal shape with back right angles.

Referring now back to FIG. 3, the alignment device 30 forms five alignment surfaces S1–S5. S1 is formed by the end side 58 (or end side 60) of the bar member 34, S2 is formed by the bar member's front side 54, and S3 is formed by the top side 50 of the bar member 34. S4 is formed by the outer radial surface of the cylindrical side wall 38 of the round member 32, and S5 is formed by the cut-off corner 44. In the illustrated alignment device 30, the radial extent of the lip 46 relative to the side wall 38 of the round member 32 is at a known distance D.

In an alignment method according to the present invention, the alignment device 30 is mounted on the laser mapping machine 10 in place of the tire 12 (FIG. 1). A laser mapping is performed and the measurement data derived from the alignment surfaces is used to determine alignment issues. Specifically:
  the mapped angle of the alignment surface S1 in a first (i.e., horizontal) direction and the mapped angle of the alignment surface S2 in a second (i.e. vertical) direction perpendicular to the first direction will reflect the perpendicularity of the laser relative to the rail 24 in the first and second directions, respectively;
  the mapped angle of the alignment surface S2 and the alignment surface S3 will reflect the parallelism of the rail 24 to the shaft 16 in the second and first directions, respectively;
  the mapped amplitude of the flat alignment surface S4 and the angled alignment surface S5 will reflect radial and out-of-plane wobble.

In this manner, the alignment device 30 can quantify a plurality of alignment parameters and thereby help guarantee test integrity. Also, the mapped measurement of the distance D will reflect laser calibration.

Although the invention has been shown and described with respect to certain embodiments, it is obvious that equivalent alterations and modifications will occur to others skilled in the art upon the reading and understanding of this specification. The present invention includes all such alterations and modifications and moreover is limited only by the scope of the following claims.

What is claimed is:

1. An alignment device for a tire laser mapping machine having a hub on which a tire is mounted, a shaft connected to the hub, a laser probe, and a rail for moving the laser probe across the tread of the tire to map the tire when it is mounted on the hub; said alignment device being shaped and sized to be mounted on the hub in place of the tire and comprising a series of connected walls forming alignment surfaces S1–S5 shaped and positioned so that when the laser probe is moved across the alignment surfaces:
  the mapping of the alignment surface S1 and the mapping of the alignment surface S2 correspond to the perpendicularity of the laser relative to the rail in a first direction and a second direction perpendicular to the first direction;
  the mapping of the alignment surface S2 and the alignment surface S3 will correspond to the parallelism of the rail to the shaft in the first and second directions; and
  the mapping of the alignment surface S4 and the alignment surface S5 will correspond to radial and out-of-plane wobble.

2. An alignment device as set forth in claim 1, wherein the alignment surface S1 is angled at a known angle in the first direction and the alignment surface S2 is angled at a known angle in the second direction and wherein the mapped angle of the alignment surface S1 in the first direction and the mapped angle of the alignment surface S2 in the second direction correspond to the perpendicularity of the laser relative to the rail in the first and second directions, respectively.

3. An alignment device as set forth in claim 1, wherein the alignment surface S2 and the alignment surface S3 each have a known angle, and the mapped angle of the alignment surface S2 and the alignment surface S3 corresponds to the parallelism of the rail to the shaft in the first and second directions, respectively.

4. An alignment device as set forth in claim 1, wherein the alignment surface S4 is angled at a known angle and the alignment surface S5 is angled at a known angle and wherein the mapped amplitude of the alignment surface S4 and the alignment surface S5 corresponds to radial and out-of-plane wobble.

5. An alignment device as set forth in claim 4, wherein the known angle at which the alignment surface S4 is angled is 0°, whereby the alignment surface S4 is flat.

6. An alignment device as set forth in claim 1, further comprising surfaces which form a radial extent at a known distance D and wherein the mapping of these surfaces correspond to laser calibration.

7. An alignment device as set forth in claim 1, wherein:
  the alignment surface S1 is angled at a known angle in the first direction and the alignment surface S2 is angled at a known angle in the second direction, whereby the mapped angle of the alignment surface S1 in the first direction and the mapped angle of the alignment surface S2 in the second direction correspond to the perpendicularity of the laser relative to the rail in the first and second directions, respectively;
  the alignment surface S2 and the alignment surface S3 each have a known angle, whereby the mapped angle of the alignment surface S2 and the mapped angle of the alignment surface S3 corresponds to the parallelism of the rail to the shaft in the first and second directions, respectively;
  the alignment surface S4 is angled at a known angle and the alignment surface S5 is angled at a known angle, whereby the mapped amplitude of the alignment surface S4 and the alignment surface S5 reflects corresponds to radial and out-of-plane wobble.

8. An alignment device as set forth in claim 7, wherein the known angle at which the alignment surface 54 is angled is 0°, whereby the alignment surface S4 is flat.

9. An alignment device as set forth in claim 7, further comprising surfaces which form a radial extent at a known distance D and wherein the mapping of these surfaces corresponds to laser calibration.

10. An alignment device as set forth in claim 1, wherein the calibration surfaces S1–S5 are formed on a round member and a bar member connected to the round member, wherein the round member has an opening through which the shaft of the laser mapping machine is received and extends in a shaft direction; and wherein the bar member extends in a direction parallel to the shaft direction.

11. An alignment device as set forth in claim 10, wherein the bar member forms alignment surfaces S1, S2 and S3, and wherein the round member forms alignment surfaces S4 and S5.

12. An alignment device as set forth in claim 11, wherein the bar member comprises a top side, a bottom side, a front side, a back side, and end sides and wherein the calibration surface S1 is formed by one of the end sides, the calibration surface S2 is formed by the front side, and the calibration surface S3 is formed by the top side.

13. An alignment device as set forth in claim 12, wherein the top side and the bottom side each have a rectangular shape with the bottom side having a lesser width and a lesser length than the top side, wherein the front side and the back side each have a trapezoidal shape with the non-parallel sides being equal in length, wherein the front side slants from the top side to the bottom side, wherein the back side extends perpendicularly between the top side and the bottom side, and wherein the end sides each have a trapezoidal shape with back right angles.

14. An alignment device as set forth in claim 11, wherein the round member comprises a circular base wall and a cylindrical side wall, and wherein the calibration surface S4 is formed by an outer radial side of the cylindrical side wall and the calibration surface S5 is formed by a cut-off corner between the base wall and the sidewall.

15. An alignment device as set forth in claim 14, wherein the distal edge of the side wall includes a radially outward lip; wherein the radial extent of the lip relative to the side wall of the round member is at a known distance D; and wherein the mapping of lip corresponds to laser calibration.

16. An alignment device as set forth in claim 11, wherein:
the round member comprises a circular base wall and a cylindrical side wall, and wherein the calibration surface S4 is formed by an outer radial side of the cylindrical side wall and the calibration surface S5 is formed by a cut-off corner between the base wall and the side wall; and
the bar member comprises a top side, a bottom side, a front side, a back side, and end sides and wherein the calibration surface S1 is formed by one of the end sides, the calibration surface S2 is formed by the front side, and the calibration surface S3 is formed by the top side.

17. An alignment device as set forth in claim 16, wherein the top side and the bottom side each have a rectangular shape, with the bottom side having a lesser width and a lesser length than the top side, wherein the front side and the back side each have a trapezoidal shape with the non-parallel sides being equal in length, wherein the front side slants from the top side to the bottom side, wherein the back side extends perpendicularly between the top side and the bottom side, and wherein the end sides each have a trapezoidal shape with back right angles.

18. In combination, a tire laser mapping machine having a hub on which a tire can be mounted and the alignment device of claim 1 mounted on the tire laser mapping machine in place of the tire.

19. A combination as set forth in claim 18, wherein the tire laser mapping machine comprises a motor-driven shaft connected to the hub, a laser probe positioned to measure tread wear, a rail for moving the laser probe across the tread of the tire, and a microprocessor for translating the laser probe readings into tread depth data.

20. A method of checking the alignment of a tire laser mapping machine, said method comprising the steps of:
mounting the alignment device of claim 1 on the machine in place of the tire;
performing a laser mapping of the alignment device to derive measurement data;
determining alignment values from the measurement data.

* * * * *